(12) United States Patent
Huang

(10) Patent No.: US 8,660,576 B2
(45) Date of Patent: *Feb. 25, 2014

(54) ADAPTIVE LOCATION DETERMINATION

(75) Inventor: Ronald K. Huang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 435 days.

This patent is subject to a terminal disclaimer.

(21) Appl. No.: 12/688,811

(22) Filed: Jan. 15, 2010

(65) Prior Publication Data

US 2011/0177832 A1   Jul. 21, 2011

(51) Int. Cl.
*H04W 24/00* (2009.01)
*G05D 1/02* (2006.01)
*G01S 3/02* (2006.01)
*G01S 19/03* (2010.01)
*G01S 19/05* (2010.01)
*G01S 19/06* (2010.01)

(52) U.S. Cl.
USPC ........ 455/456.1; 701/300; 701/469; 342/450; 342/463; 342/357.4; 342/357.42; 342/357.43

(58) Field of Classification Search
USPC ................ 455/456.1–457; 701/469, 300; 342/357.4, 357.42, 357.43, 450, 342/463–465
See application file for complete search history.

(56) References Cited

U.S. PATENT DOCUMENTS

| | | |
|---|---|---|
| 5,394,158 A | 2/1995 | Chia |
| 5,412,388 A * | 5/1995 | Attwood ............ 342/357.21 |
| 5,444,450 A | 8/1995 | Olds et al. |
| 5,493,286 A | 2/1996 | Grube et al. |
| 5,508,707 A | 4/1996 | LeBlanc et al. |

(Continued)

FOREIGN PATENT DOCUMENTS

| | | |
|---|---|---|
| CN | 101667208 | 3/2010 |
| EP | 1 843 524 | 10/2007 |

(Continued)

OTHER PUBLICATIONS

Hiroaki Koshima and Joseph Hoshen, "Personal locator services emerge," IEEE Spectrum, Feb. 2000, pp. 41-48.

(Continued)

*Primary Examiner* — Matthew Sams
(74) *Attorney, Agent, or Firm* — Fish & Richardson P.C.

(57) ABSTRACT

Methods, program products, and systems for adaptive location determination are described. A server computer can receive location information from location-aware mobile devices (e.g., GPS-enabled devices) located in a cell of a cellular communications network. The server computer can calculate an average geographic location using the received locations and distance between each location and the calculated average. The server computer can exclude locations that are sufficiently far away from the average. The server computer can repeat the calculation and exclusion until a level of precision is achieved for the average geographic location. The average geographic location and an error margin can be associated with the cell. The server computer can provide the average geographic location and the error margin to a mobile device (e.g., a non-GPS-enabled device) that is in the cell. The mobile device can display the information on a map display of the mobile device.

26 Claims, 9 Drawing Sheets

(56) References Cited

U.S. PATENT DOCUMENTS

| | | | |
|---|---|---|---|
| 5,539,924 A | 7/1996 | Grube et al. | |
| 5,570,412 A | 10/1996 | LeBlanc | |
| 5,642,303 A | 6/1997 | Small et al. | |
| 5,802,468 A | 9/1998 | Gallant et al. | |
| 5,913,170 A | 6/1999 | Wortham | |
| 5,945,944 A | 8/1999 | Krasner | |
| 5,945,948 A | 8/1999 | Buford et al. | |
| 6,122,520 A | 9/2000 | Want et al. | |
| 6,232,915 B1 | 5/2001 | Dean et al. | |
| 6,236,861 B1 | 5/2001 | Naor et al. | |
| 6,321,092 B1 * | 11/2001 | Fitch et al. | 455/456.5 |
| 6,363,255 B1 | 3/2002 | Kuwahara | |
| 6,424,840 B1 | 7/2002 | Fitch et al. | |
| 6,445,937 B1 | 9/2002 | daSilva | |
| 6,625,457 B1 | 9/2003 | Raith | |
| 6,947,880 B2 * | 9/2005 | Johnson et al. | 703/2 |
| 7,072,666 B1 | 7/2006 | Kullman et al. | |
| 7,076,258 B2 | 7/2006 | Motegi et al. | |
| 7,120,459 B2 | 10/2006 | Sawada et al. | |
| 7,127,257 B2 | 10/2006 | Riley et al. | |
| 7,133,685 B2 | 11/2006 | Hose et al. | |
| 7,209,753 B2 | 4/2007 | Raith | |
| 7,305,245 B2 | 12/2007 | Alizadeh-Shabdiz et al. | |
| 7,346,359 B2 * | 3/2008 | Damarla et al. | 455/456.1 |
| 7,403,762 B2 | 7/2008 | Morgan et al. | |
| 7,414,988 B2 | 8/2008 | Jones et al. | |
| 7,433,693 B2 * | 10/2008 | Sheynblat | 455/456.1 |
| 7,433,694 B2 | 10/2008 | Morgan et al. | |
| 7,457,628 B2 | 11/2008 | Blumberg et al. | |
| 7,471,954 B2 | 12/2008 | Brachet et al. | |
| 7,474,897 B2 | 1/2009 | Morgan et al. | |
| 7,478,578 B2 | 1/2009 | Kirkpatrick | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz et al. | |
| 7,528,772 B2 | 5/2009 | Ruutu et al. | |
| 7,551,579 B2 | 6/2009 | Alizadeh-Shabdiz et al. | |
| 7,551,929 B2 | 6/2009 | Alizadeh-Shabdiz et al. | |
| 7,587,205 B1 | 9/2009 | Odorfer et al. | |
| 7,664,511 B2 | 2/2010 | Wang et al. | |
| 7,769,396 B2 * | 8/2010 | Alizadeh-Shabdiz et al. | 455/456.6 |
| 7,818,017 B2 * | 10/2010 | Alizadeh-Shabdiz et al. | 455/456.6 |
| 7,974,642 B2 * | 7/2011 | Lin et al. | 455/456.6 |
| 8,050,686 B1 * | 11/2011 | Souissi et al. | 455/456.1 |
| 8,200,251 B2 | 6/2012 | Huang | |
| 2002/0067308 A1 | 6/2002 | Robertson | |
| 2002/0168988 A1 | 11/2002 | Younis | |
| 2003/0060213 A1 * | 3/2003 | Heinonen et al. | 455/456 |
| 2003/0087647 A1 * | 5/2003 | Hurst | 455/456 |
| 2004/0072577 A1 * | 4/2004 | Myllymaki et al. | 455/456.1 |
| 2004/0176107 A1 | 9/2004 | Chadha | |
| 2004/0203845 A1 | 10/2004 | Lal | |
| 2005/0040968 A1 * | 2/2005 | Damarla et al. | 340/825.49 |
| 2005/0075119 A1 * | 4/2005 | Sheha et al. | 455/456.6 |
| 2005/0096084 A1 | 5/2005 | Pohja et al. | |
| 2005/0239478 A1 * | 10/2005 | Spirito | 455/456.1 |
| 2006/0009152 A1 | 1/2006 | Millard et al. | |
| 2006/0068812 A1 | 3/2006 | Carro et al. | |
| 2006/0085419 A1 | 4/2006 | Rosen | |
| 2006/0095348 A1 | 5/2006 | Jones et al. | |
| 2006/0095349 A1 | 5/2006 | Morgan et al. | |
| 2006/0106850 A1 | 5/2006 | Morgan et al. | |
| 2006/0148466 A1 | 7/2006 | Brethereau et al. | |
| 2006/0172737 A1 | 8/2006 | Hind et al. | |
| 2006/0200843 A1 | 9/2006 | Morgan et al. | |
| 2006/0211444 A1 | 9/2006 | Koike | |
| 2006/0217130 A1 | 9/2006 | Rowitch et al. | |
| 2006/0217131 A1 | 9/2006 | Alizadeh-Shabdiz et al. | |
| 2006/0240840 A1 | 10/2006 | Morgan et al. | |
| 2006/0264222 A1 | 11/2006 | Cole et al. | |
| 2007/0002813 A1 | 1/2007 | Tenny et al. | |
| 2007/0004427 A1 | 1/2007 | Morgan et al. | |
| 2007/0004428 A1 | 1/2007 | Morgan et al. | |
| 2007/0008925 A1 | 1/2007 | Dravida et al. | |
| 2007/0010261 A1 * | 1/2007 | Dravida et al. | 455/456.3 |
| 2007/0066322 A1 | 3/2007 | Bahl | |
| 2007/0121560 A1 | 5/2007 | Edge | |
| 2007/0155307 A1 | 7/2007 | Ng et al. | |
| 2007/0203647 A1 | 8/2007 | Mizuochi et al. | |
| 2007/0207816 A1 * | 9/2007 | Spain, Jr. | 455/456.1 |
| 2007/0287473 A1 | 12/2007 | Dupray | |
| 2007/0290924 A1 * | 12/2007 | McCoy | 342/464 |
| 2008/0008117 A1 | 1/2008 | Alizadeh-Shabdiz | |
| 2008/0008118 A1 | 1/2008 | Alizadeh-Shabdiz | |
| 2008/0008119 A1 | 1/2008 | Alizadeh-Shabdiz | |
| 2008/0008120 A1 | 1/2008 | Alizadeh-Shabdiz | |
| 2008/0008121 A1 | 1/2008 | Alizadeh-Shabdiz | |
| 2008/0036661 A1 * | 2/2008 | Smith et al. | 342/464 |
| 2008/0057955 A1 | 3/2008 | Choi-Grogan | |
| 2008/0117201 A1 | 5/2008 | Martinez et al. | |
| 2008/0123608 A1 | 5/2008 | Edge et al. | |
| 2008/0132170 A1 | 6/2008 | Alizadeh-Shabdiz et al. | |
| 2008/0139217 A1 | 6/2008 | Alizadeh-Shabdiz et al. | |
| 2008/0171556 A1 | 7/2008 | Carter | |
| 2008/0176583 A1 | 7/2008 | Brachet et al. | |
| 2008/0186882 A1 | 8/2008 | Scherzer et al. | |
| 2008/0225779 A1 | 9/2008 | Bragiel et al. | |
| 2008/0259885 A1 | 10/2008 | Faulkner et al. | |
| 2009/0005077 A1 | 1/2009 | Forstall et al. | |
| 2009/0005080 A1 | 1/2009 | Forstall et al. | |
| 2009/0005981 A1 | 1/2009 | Forstall et al. | |
| 2009/0061870 A1 | 3/2009 | Finkelstein et al. | |
| 2009/0067420 A1 | 3/2009 | Ganesan et al. | |
| 2009/0070038 A1 | 3/2009 | Geelen et al. | |
| 2009/0075672 A1 | 3/2009 | Jones et al. | |
| 2009/0088183 A1 | 4/2009 | Piersol et al. | |
| 2009/0132652 A1 | 5/2009 | Athale et al. | |
| 2009/0149197 A1 | 6/2009 | Morgan et al. | |
| 2009/0154371 A1 | 6/2009 | Alizadeh-Shabdiz et al. | |
| 2009/0175189 A1 | 7/2009 | Alizadeh-Shabdiz et al. | |
| 2009/0181672 A1 | 7/2009 | Horn et al. | |
| 2009/0227270 A1 | 9/2009 | Naaman | |
| 2009/0234876 A1 | 9/2009 | Schigel et al. | |
| 2009/0252138 A1 | 10/2009 | Alizadeh-Shabdiz et al. | |
| 2009/0275341 A1 | 11/2009 | Monnes et al. | |
| 2009/0280801 A1 | 11/2009 | Malik | |
| 2009/0303112 A1 | 12/2009 | Alizadeh-Shabdiz | |
| 2009/0303113 A1 | 12/2009 | Alizadeh-Shabdiz | |
| 2009/0303114 A1 | 12/2009 | Alizadeh-Shabdiz | |
| 2009/0303115 A1 | 12/2009 | Alizadeh-Shabdiz | |
| 2009/0303119 A1 | 12/2009 | Alizadeh-Shabdiz | |
| 2009/0303120 A1 | 12/2009 | Alizadeh-Shabdiz | |
| 2009/0303121 A1 | 12/2009 | Alizadeh-Shabdiz | |
| 2009/0310585 A1 | 12/2009 | Alizadeh-Shabdiz et al. | |
| 2009/0310658 A1 | 12/2009 | Garg et al. | |
| 2009/0312035 A1 | 12/2009 | Alizadeh-Shabdiz et al. | |
| 2009/0312036 A1 | 12/2009 | Alizadeh-Shabdiz et al. | |
| 2010/0099438 A1 | 4/2010 | Oh | |
| 2010/0156713 A1 | 6/2010 | Harper | |
| 2010/0234045 A1 | 9/2010 | Karr et al. | |
| 2010/0240369 A1 | 9/2010 | Law et al. | |
| 2010/0255856 A1 | 10/2010 | Kansal et al. | |
| 2011/0047368 A1 | 2/2011 | Sundaramurthy et al. | |
| 2011/0165892 A1 | 7/2011 | Ristich et al. | |
| 2011/0176523 A1 | 7/2011 | Huang et al. | |
| 2011/0177825 A1 | 7/2011 | Huang | |
| 2011/0177826 A1 | 7/2011 | Huang et al. | |
| 2011/0177831 A1 | 7/2011 | Huang | |
| 2011/0177832 A1 | 7/2011 | Huang | |
| 2011/0249668 A1 | 10/2011 | Milligan et al. | |
| 2011/0250903 A1 | 10/2011 | Huang et al. | |
| 2011/0252422 A1 | 10/2011 | Rothert et al. | |
| 2011/0252423 A1 | 10/2011 | Freedman et al. | |
| 2011/0252429 A1 | 10/2011 | Ballard et al. | |
| 2011/0252430 A1 | 10/2011 | Chapman et al. | |
| 2012/0171989 A1 | 7/2012 | Matsuo et al. | |

FOREIGN PATENT DOCUMENTS

| | | |
|---|---|---|
| EP | 2 063 623 | 5/2009 |
| EP | 2 110 684 | 10/2009 |
| WO | WO 00/17803 | 3/2000 |

(56) References Cited

FOREIGN PATENT DOCUMENTS

| WO | WO 2007/147451 | 12/2007 |
|---|---|---|
| WO | WO 2008/126959 | 10/2008 |
| WO | WO 2009/059964 | 5/2009 |
| WO | WO 2009/070138 | 6/2009 |
| WO | WO 2009/089308 | 7/2009 |
| WO | WO 2010/129094 | 11/2010 |

OTHER PUBLICATIONS

Final Office Action in U.S. Appl. No. 12/869,553, mailed Apr. 15, 2013, 24 pages.
Examination Report in CN201010570595.6, mailed Apr. 1, 2013, 17 pages.
"Part 11: Wireless LAN Medium Access Control (MAC) and Physical Layer (PHY) specifications: Higher-Speed Physical Layer Extension in the 2.4 GHz Band", IEEE Std 802.11a, 1999.
"Part 16: Air Interface for Fixed Broadbank Wireless Access Systems", IEEE Std 802.16, 2004.
International Search Report and Written Opinion in PCT/US2011/021182 mailed Jun. 9, 2011, 12 pages.
International Search Report and Written Opinion in PCT/US2011/021172, mailed Apr. 5, 2011, 9 pages.
International Search Report and Written Opinion in PCT/US2010/046707 mailed Dec. 8, 2010, 12 pages.
Spratt, "An Overview of Positioning by Diffusion," Wireless Networks; The Journal of Mobile Communication, Computation and Information, 2003(9)(6):565-574.
International Preliminary Report on Patentability in PCT/US2011/021172 mailed Jul. 26, 2012, 6 pages.
International Preliminary Report on Patentability in PCT/US2010/046707 mailed Jul. 26, 2012, 9 pages.
Non-Final Office Action in U.S. Appl. No. 12/869,385 mailed Aug. 17, 2012, 27 pages.
Restriction Requirement in U.S. Appl. No. 12/869,518 mailed Jul. 25, 2012, 27 pages.
Non-Final Office Action in U.S. Appl. No. 12/869,553 mailed Jul. 13, 2012, 23 pages.
Non-Final Office Action in U.S. Appl. No. 12/869,566, mailed Sep. 28, 2012, 17 pages.
Non-Final Office Action in U.S. Appl. No. 12/959,284, mailed Oct. 24, 2012, 16 pages.

* cited by examiner

ADAPTIVE LOCATION DETERMINATION

TECHNICAL FIELD

This disclosure relates generally to geographic location determination.

BACKGROUND

A cellular communications network can include a radio network made up of a number of radio cells or "cells". Each cell can be served by at least one fixed-location transceiver or "cell tower" in this specification. The cells can cover different land areas to provide radio coverage over a wider area than can be covered by a single transceiver. A variable number of mobile devices (e.g., cellular phones) can be used in any one cell. The mobile devices can make and receive telephone calls or transmit and receive data because the mobile devices can be connected over the air to a nearby cell tower. A mobile device can move from one cell to another during transmission, thereby switching cell towers to which the mobile device is connected. The mobile device "knows" the cell tower that is currently connected to the mobile device by an identifier of the cell tower (e.g., a cell identifier). A location of a cell, if known, can be used to determine an approximate geographic location of the mobile device. However, a cell can cover a large geographic area (e.g., a circle having radius of a kilometer or more). Therefore, the estimate can lack accuracy. Furthermore, the exact location of a cell tower does not necessarily coincide with the location of the mobile devices.

SUMMARY

Methods, program products, and systems for adaptive location determination using mobile devices are described. A server computer can receive location information from location-aware mobile devices (e.g., GPS-enabled devices) located in a cell of a cellular communications network. The server computer can calculate an average geographic location using the received locations and distance between each location and the calculated average. The server computer can exclude locations that are sufficiently far away from the average. The server computer can repeat the calculation and exclusion until a level of precision is achieved for the average geographic location. The average geographic location and an error margin can be associated with the cell. The server computer can provide the average geographic location and the error margin to a mobile device (e.g., a non-GPS-enabled device) that is in the cell as an estimated location of the mobile device. The mobile device can display the information on a map display of the mobile device.

Techniques for adaptive location determination can be implemented to achieve the following exemplary advantages. A geographic area can be associated with a cell of a cellular network when the location of the cell tower is unknown. The geographic area can correspond to an area where an actual mobile device that can connect to the cell tower is likely to be located, rather than the location of a cell tower. The geographic area can be estimated based on real time data that are updated frequently by mobile devices, rather than based on data from service providers or a government database that can be updated less frequently. As a result, the result can be more up-to-date. The geographic area can be calculated based on data received from the mobile devices at various times of day, therefore the geographic area can correspond to various usage patterns, for example, for commute hour, business hour, or night. The geographic area associated with a cell can be used to estimate a location of a non-GPS-enabled mobile device that can connect to the cell tower in the cell. The estimate can be more accurate than using the actual location of the cell tower because, for example, some cell towers are located outside of an area where mobile devices using the cell tower are usually located (e.g., mobile devices on a highway can use a cell tower that is located a distance away from the highway). For GPS-enabled mobile devices, estimating a location using the geographic area associated with a cell can be advantageous when, for example, GPS signals are weak (e.g., inside buildings). On a GPS-Enabled mobile device, the geographic area associated with a cell can be used to provide an almost instantaneous location estimate of the mobile device. For example, when the mobile device is turned on and before the mobile device determines a location based on the GPS signals, an estimated location based on a cell in which the mobile device is located can be displayed.

The details of one or more implementations of adaptive location determination are set forth in the accompanying drawings and the description below. Other features, aspects, and advantages of adaptive location determination will become apparent from the description, the drawings, and the claims.

BRIEF DESCRIPTION OF THE DRAWINGS

Like reference symbols in the various drawings indicate like elements.

DETAILED DESCRIPTION

Overview of Adaptive Location Determination

Figure 1:
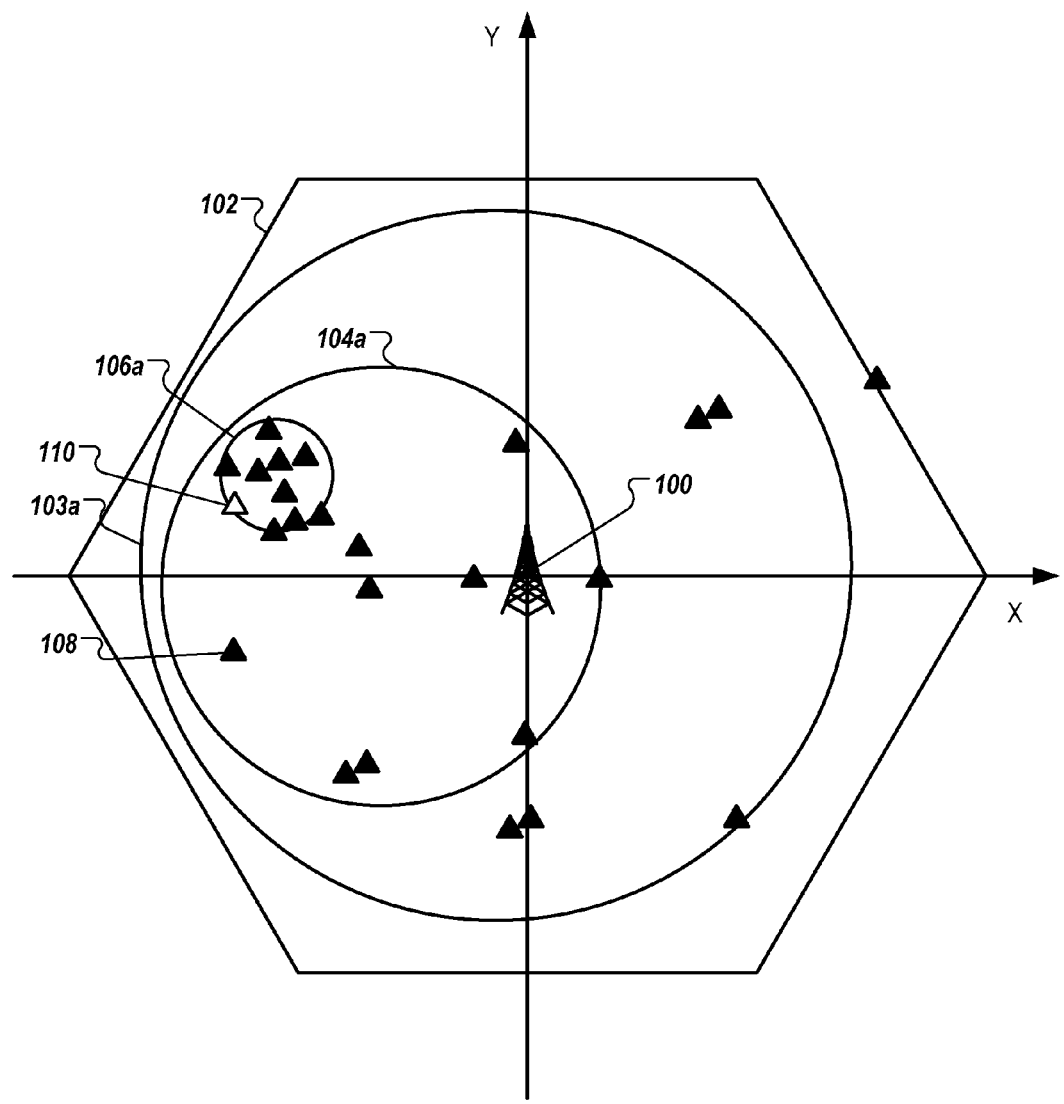
FIG. 1 is an overview of the techniques of adaptive location determination using mobile devices.

FIG. 1 is an overview of the techniques of adaptive location determination using mobile devices. For convenience, the techniques will be described in reference to a system that implements the techniques of locating cells of a cellular communications network using mobile devices.

A cellular communications network can be a radio network that includes a number of cells. A cell can be an area served by one or more cell towers. In FIG. 1, cell 102 is served by cell tower 100. Mobile devices 108 located within the cell can communicate with each other or with other devices (e.g., data servers or landline phones) inside or outside cell 102 through cell tower 100 that serves the cell. Cell 102 can be an area defined by one or more geographic boundaries that are determined by, for example, communication ranges of cell tower 100 and cell towers in neighboring cells. Mobile devices 108 can enter cell 102 when, for example, mobile device 108 switches cell towers to which mobile device 108 was connected to cell tower 100.

Figure 2A:
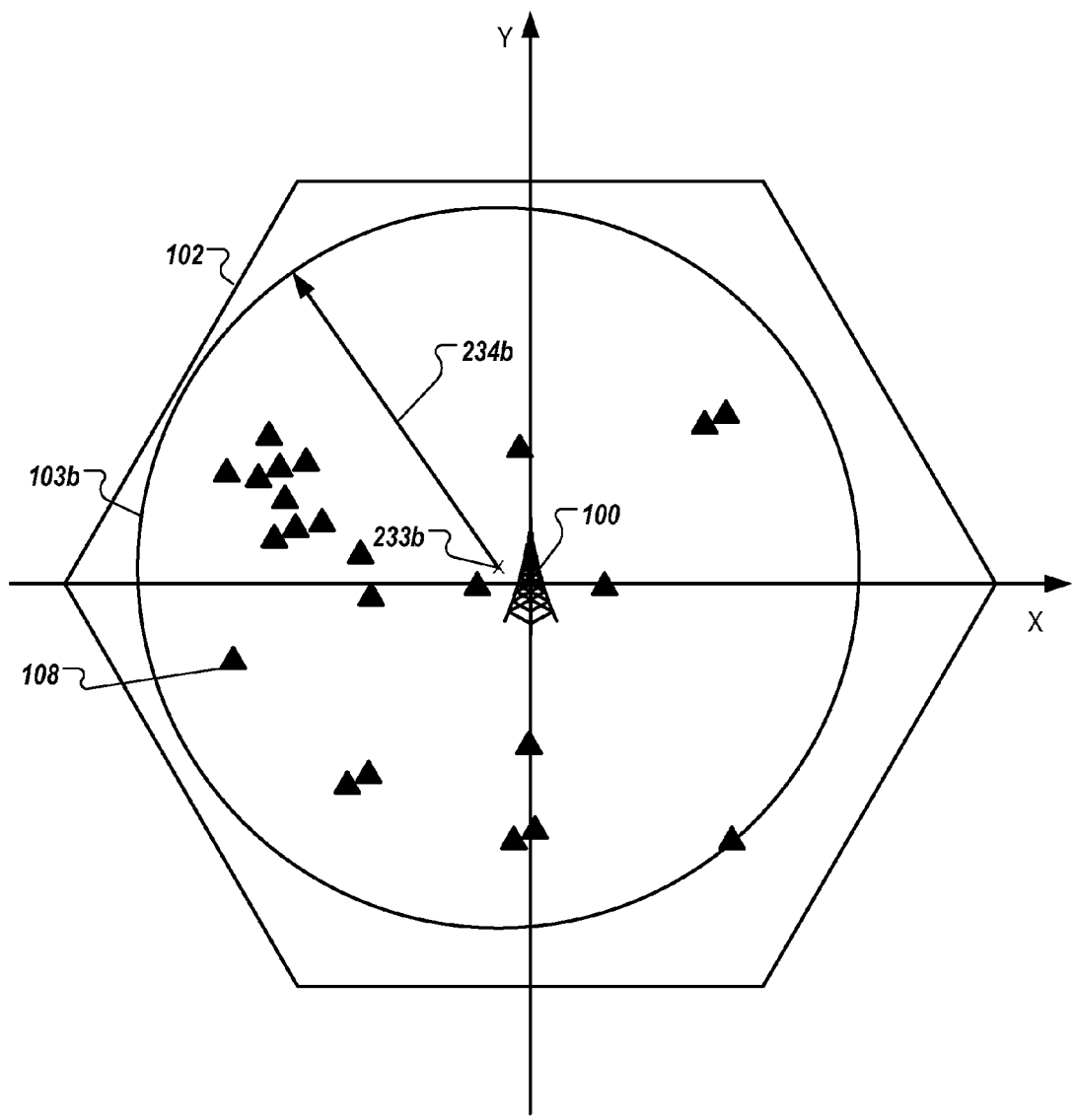
FIGS. 2A-2C illustrate exemplary stages of adaptive location determination using mobile devices.
Figure 2B:
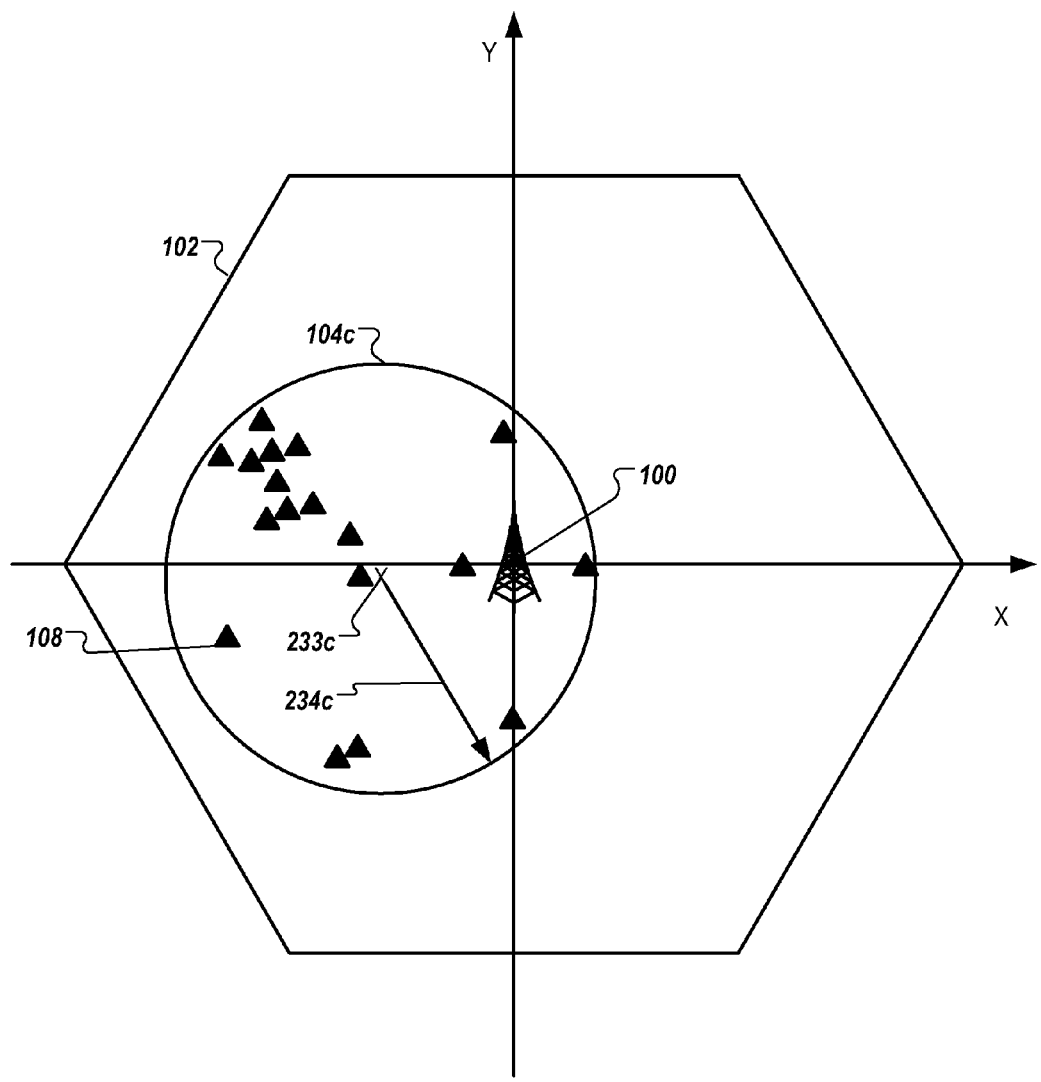
Figure 2C:
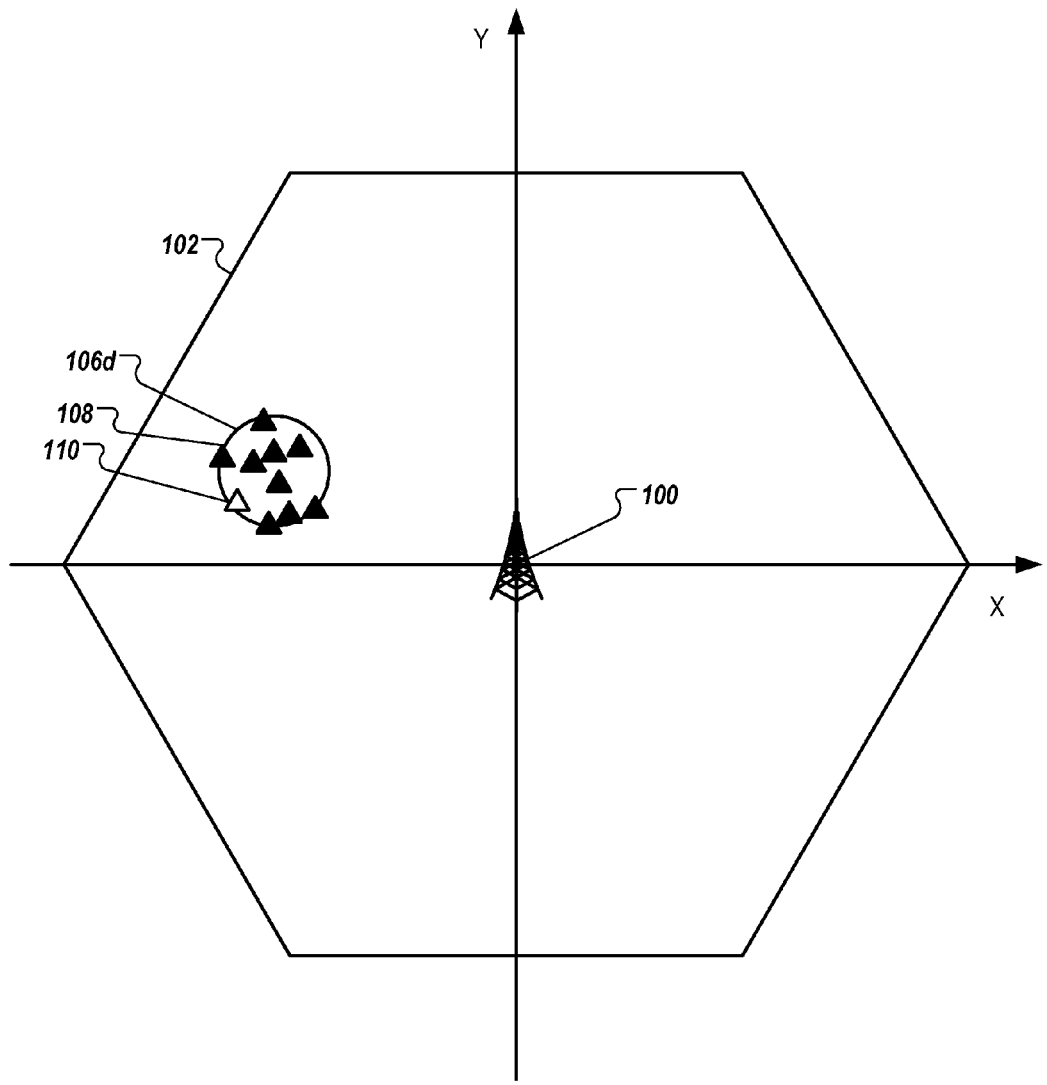
Figure 2D:
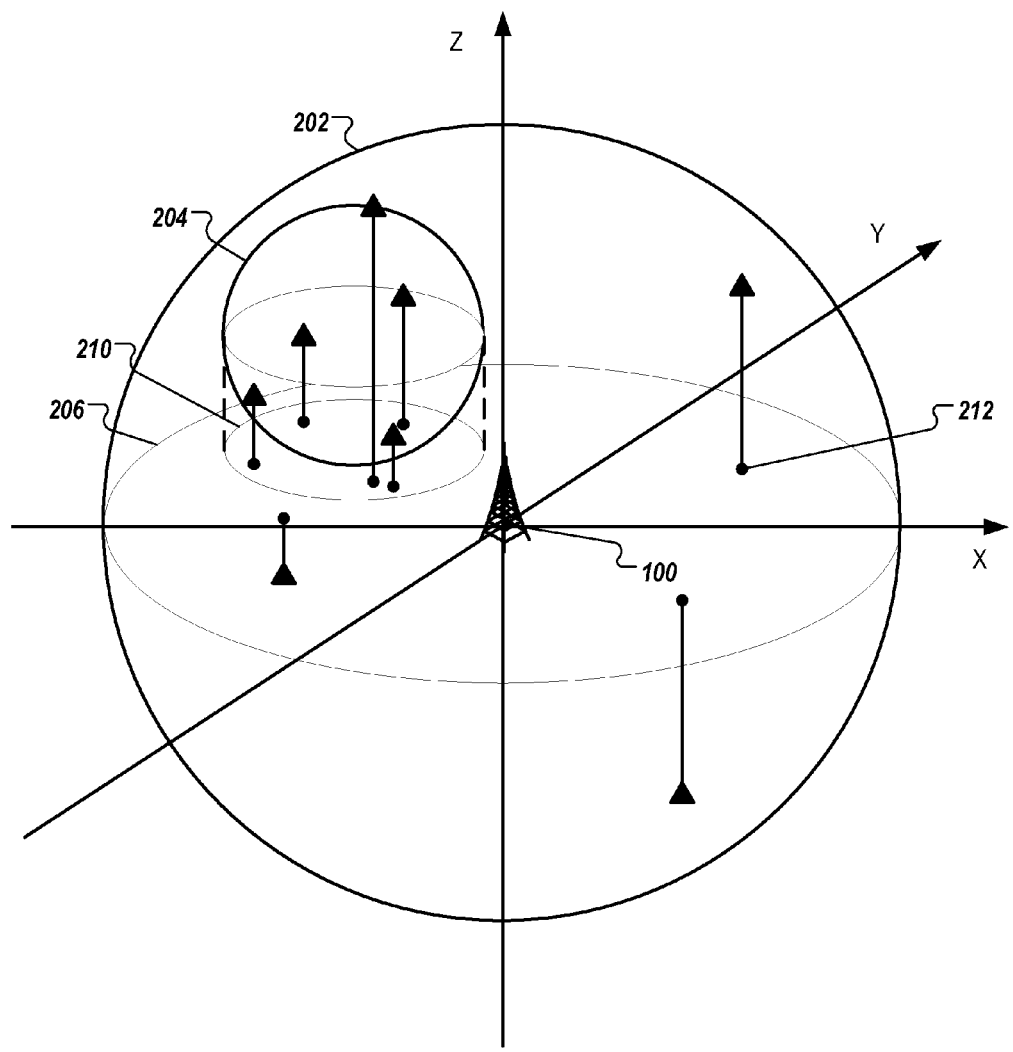
FIG. 2D illustrates an exemplary stage of adaptive location determination using mobile devices in a three-dimensional space.
Figure 3:
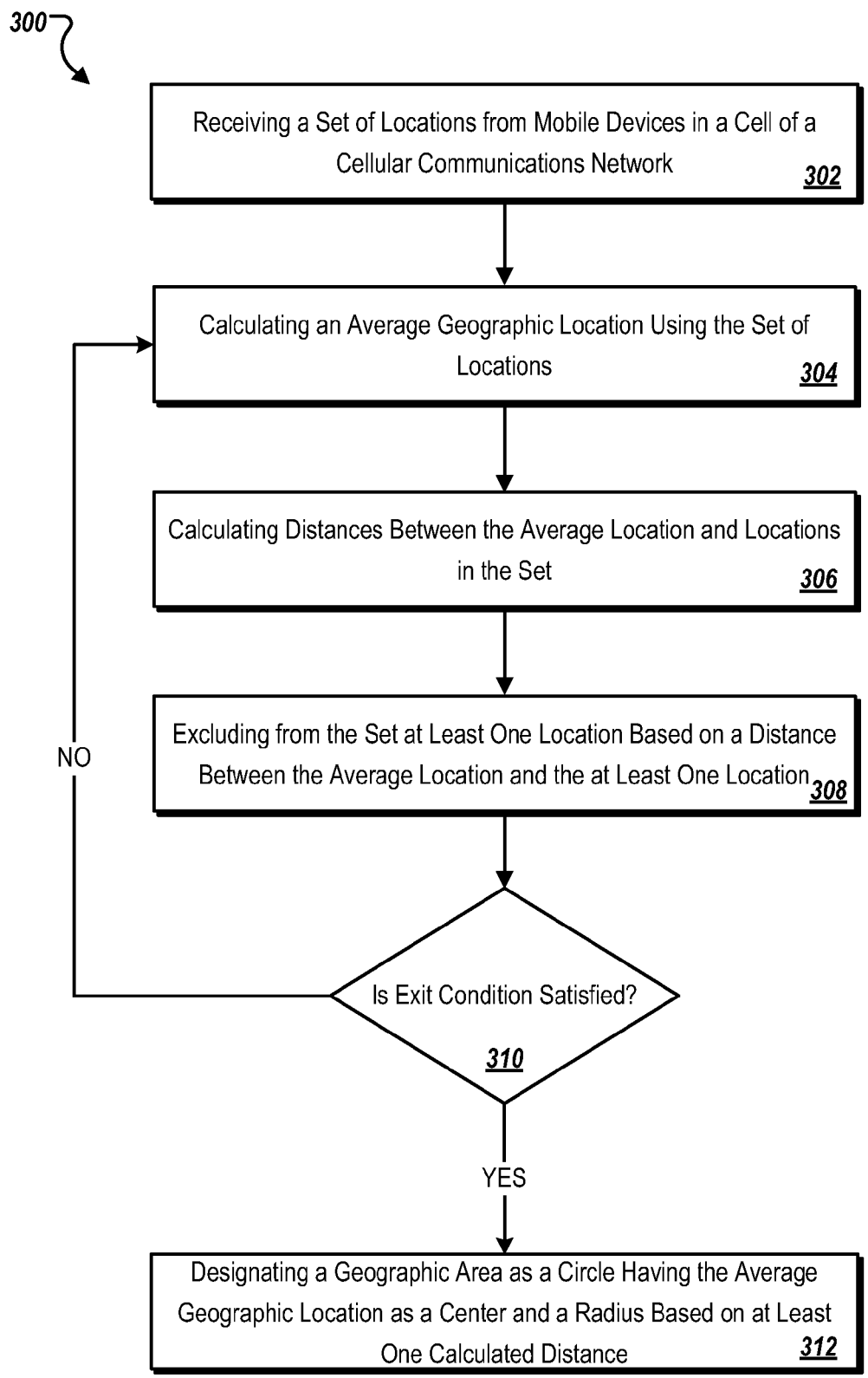
FIG. 3 is a flowchart illustrating an exemplary process of adaptive location determination using mobile devices.

Each of mobile devices 108 and other mobile devices represented in FIGS. 1-3 as a black triangle can be a location-aware device that can determine a current location using various technologies (e.g., GPS). Mobile device 110, which is represented as a white triangle, can be a non-GPS-enabled mobile device that is not equipped with hardware components that allows it to determine its current geographic location. X and Y axes of FIG. 1 are shown to illustrate that locations of mobile devices 108 can be determined on a two-dimensional area defined by axes X and Y. For example, X and Y axes can correspond to longitudes and latitudes, respectively. For convenience, location of cell tower 100 is shown to coincide with point zero on the X and Y axes in FIG. 1. In some implementations, an actual location (e.g., latitude and longitude coordinates) of cell tower 100 is optional in the calculations.

When mobile devices 108 communicate with cell tower 100, mobile devices 108 can transmit location information to the system through cell tower 100. The location information can be associated with an identifier of cell 102 (e.g., a cell identifier or cell ID of cell 102). The system can use the location information transmitted from multiple mobile devices 108 to determine an estimated geographic area that can be associated with the cell. The estimated geographic area does not necessarily enclose a point where cell tower 100 is actually located. Neither is it necessary for the estimated geographic area to correspond to the geometric location or shape of cell 102, although the estimated geographic area can be located within cell 102. The estimated geographic area can correspond to an area where mobile devices (including location-aware devices 108 and non-GPS-enabled device 110) are likely to be located when the mobile devices are in cell 102. The estimated geographic area can be used to determine a current location of mobile device 110.

The system that has received multiple locations transmitted from mobile device 108 can determine the estimated geographic area using an iterative process (e.g., by performing a multi-pass analysis). The system can initially calculate an average geographic location (e.g., a centroid) using a set that contains locations received from mobile devices 108 that are located in cell 102 that is served by cell tower 100. In each pass of the multi-pass analysis, the system can calculate a new average geographic location based on the locations in the set, calculate a distance between the average geographic location and each location in the set, and exclude from the set one or more outliers. Outliers can be locations in the set that are located the farthest from the average geographic location. The system can repeat the multi-pass analysis until an exit condition is satisfied (e.g., after a certain number of passes have run, or when other exist conditions are satisfied).

For example, in various passes of the multi-pass analysis, the estimated geographic area can be circles 103a, 104a, and 106a, respectively. Centers of circles 103a, 104a, and 106a can each correspond to an average geographic location of the locations in the set in a distinct stage (e.g., a pass of the multi-pass analysis). In each pass, the set of locations can be reduced by excluding the outliers. A location can be excluded from the set if the distance between the location and an average geographic location exceeds a threshold.

In some implementations, radii of circles 103a, 104a, and 106a can each represent an estimated error margin of the geographic areas. The smaller the radius, the more the precision of the estimated geographic location. Each of the radii of a circle 103a, 104a, and 106a can be determined based on at least one calculated distance between the average geographic location and each location in the set.

The multi-pass analysis can result in a final average geographic location (e.g., center of circle 106a) and a final estimated error margin (e.g., radius of circle 106a) when the exit condition is satisfied. The final estimated error margin can be defined based on distances (e.g., a longest distance) between the final average geographic location and locations remaining in the set. Circle 106a can be associated with cell 102 and used for estimating locations of non-GPS-enabled mobile devices (e.g., mobile device 110) that can connect to cell tower 100.

FIGS. 2A-2C illustrate exemplary stages of location determination using mobile devices. For convenience, the techniques will be described in reference to a system that implements the techniques, such as the system shown in FIG. 1.

FIG. 2A illustrates an stage of a multi-pass analysis for calculating an average location. Each black triangle of FIG. 2A can represent a mobile device (e.g., mobile device 108) located in cell 102. Each mobile device 108 can be associated with a current location of mobile device 108. The current location can be represented by geographic coordinates that include a latitude and a longitude of mobile device 108.

Distribution of mobile devices 108 can reflect a snapshot of mobile devices 108 at a particular time (e.g., 8:30 am local time for a time zone in which cell 102 is located) or locations of mobile devices 108 over a period of time (e.g., six hours). In the former case, each mobile device 108 can be associated with a single location. In the latter case, each mobile device 108 can be associated with multiple locations (e.g., when mobile device 108 is moving). Mobile device 108 that is associated with multiple locations can be represented by multiple locations in FIG. 2A.

For example, mobile device 108 can be a location-aware mobile telephone. If a person is using the location-aware mobile telephone while moving (e.g., walking, driving, etc.), the mobile telephone can have a distinct location every minute. In some implementations, the mobile telephone can transmit the location to the system periodically (e.g., every minute) through cell tower 100. In some implementations, the mobile telephone can cache (e.g., record) the locations periodically (e.g., every minute), and transmit the cached locations when sufficient bandwidth exists such that the transmission does not interfere with the performance of the mobile telephone (e.g., when the person finishes talking and hangs up). Each distinct location can be represented as a distinct black triangle in FIG. 2A. The data transmitted to the system need not include privacy information that may be linked to a user of mobile device. For example, a user account name and telephone number need not be transmitted.

The system can determine an average geographic location of a set of locations received from mobile devices 108. The set of locations can include locations received from mobile devices 108 at a particular time or during a particular time period. The average geographic location can be designated as center 233b of circle 103b. Center 233b of circle 103b need not coincide with the location of cell tower 100. A distance between the average geographic location and each location in the set can be calculated. Locations whose distances to the center exceed a threshold can be excluded from the set. Circle 103b can have radius 234b that is calculated based on the longest distance between the average geographic location and locations in a current set.

FIG. 2B illustrates another stage of the multi-pass analysis subsequent to the stage of FIG. 2A. Locations whose distances to the average geographic location of FIG. 2A (center 233b of circle 103b) exceed a threshold are excluded from the set. The threshold can be configured such that a percentage of locations (e.g., five percent of locations of FIG. 2A) are excluded. A new average geographic location can be calculated based on the locations remaining in the set (e.g., the 95 percent of locations remaining). The new average geographic location can be, for example, center 233c of circle 104c. In various implementations, calculating the new average geographic location can include averaging the remaining locations in the set, selecting a medium geographic location in the set (e.g., by selecting a medium latitude or a medium longitude), or applying other algorithms. Algorithms for calculating the average geographic location can be identical in each pass of the multi-pass analysis, or be distinct from each other in each pass.

The area encompassed by circle 104c can be smaller than the area encompassed by circle 103b as determined in a prior pass when outlier locations are excluded. The smaller area can reflect an increased precision of the calculation. Center 233c of circle 104c does not necessarily coincide with center 233b of circle 103b. In some implementations, radius 234c of circle 104c can correspond to a remaining location of mobile device 108 that is farthest away from center 233c of circle 104c. The radius can represent an error margin of the new estimated geographic location calculated in the current pass.

FIG. 2C illustrates an exemplary final stage of the multi-pass analysis. The final pass can produce a final average geographic location that corresponds to a cluster of positions of mobile devices 108. The final average geographic location can be designated as a center of circle 106d. Circle 106d can have a radius that corresponds to a final error margin, which is based on a distance between the final average geographic location and a location in the cluster. Circle 106d can represent a geographic area in which a mobile device in cell 102 is most likely located based on the multi-pass analysis. For convenience, the geographic area in which a mobile device in cell 102 is most likely located, as calculated by the multi-pass analysis, will be referred to as a presence area.

The presence area can be associated with cell 102. The system can send information of the presence area to a mobile device (e.g., mobile device 110) located in cell 102 for display on a map display, regardless of whether mobile device 210 is GPS-enabled. The information of the presence area can include the final average geographic location (e.g., latitude and longitude of the center of circle 106d) and the error margin of the estimate associated with the presence area (e.g., the radius of circle 106d).

FIG. 2D illustrates an exemplary stage of adaptive location determination using mobile devices in a three-dimensional space. Some location-aware mobile devices 108 (e.g., GPS-enabled devices) can identify locations in three-dimensional space. The locations can be represented by latitudes, longitudes, and altitudes. Locating a mobile device in a three-dimensional space can be desirable when an altitude of the mobile device is necessary for locating the mobile device. For example, it can be desirable to determine on which floor the mobile device is located in a high-rise building.

In FIG. 2D, axes X, Y, and Z can be used to indicate a three-dimensional space. For example, axes X, Y, and Z can represent longitude, latitude, and altitude, respectively. For convenience, location of cell tower 100 is shown to coincide with point zero on the X, Y, and Z axes in FIG. 2D. In some implementations, an actual location (e.g., latitude, longitude, and altitude coordinates) of cell tower 100 is optional in the calculations.

Each triangle of FIG. 2D can represent a location of a device located in a three-dimensional cell space 202. The locations can have projections (e.g., projection 212) on a plane in the three-dimensional space. The plane can be defined at arbitrary altitude (e.g., the altitude of cell tower 100). Cell space 202 can intersect with the plane at circle 206. Projection 212 and intersection circle 206 are shown to illustrate the locations of mobile devices 108. In some implementations, determining the projections and intersections is optional in the calculations.

A multi-pass analysis that can associate a geographic space with cell space 202 of a cellular communications network based on a set of locations received from location-aware mobile devices 108 that are located in cell space 202. In a pass of the multi-path analysis, an average geographic location (e.g., center of space 204) can be determined by, for example, averaging the latitudes, longitudes, and altitudes coordinates of locations in the set. Distances between the average geographic location and locations in cell space 202 can be calculated. Locations that are within cell space 202 but are sufficiently far away from the average geographic location can be excluded from the set and from further computations. A radius of sphere 204 can be determined by, for example, the farthest distance between remaining locations in the set and the average geographic location. Circle 210 illustrates projection of the space encompassed by sphere 204 on the plane.

The system can repeat the stages of calculating an average geographic location in a set, calculating distances between the average geographic location and the locations in the set, and excluding from the set locations based on the calculated distances. The repetition can continue until an exit condition is satisfied. A space having a center at the average geographic location and a radius that is based on a distance between the average geographic location and a remaining location in the set can be designated as a geographic space that can be associated with the cell space 202. For convenience, the space enclosed by the sphere having a center at the average geographic location and a radius that is based on a distance between the average geographic location and a remaining location in the set will be referred to as a presence space in this specification. The presence space can indicate a space in which a mobile device (e.g., mobile device 110) is likely to be located when the mobile device is in cell space 202 (e.g., when the mobile device is served by cell tower 100).

Exemplary Process and System for Adaptive Location Determination

FIG. 3 is a flowchart illustrating exemplary process 300 of adaptive location determination using mobile devices. Process 300 can be used, for example, to determine a presence area or presence space associated with a cell of a cellular communications network, which can be used to determine a location of a non-GPS-enabled mobile device. For convenience, process 300 will be described in reference to a system that implements process 300, location-aware mobile devices 108, and cell 102.

The system can receive (302) a set locations from one or more mobile devices 108 in cell 102. Each location can be represented by geographic coordinates (e.g., latitude, longitude, and altitude). In various implementations, the set of locations can correspond to a period of time (e.g., 6 hours, or from 6 am to 10 am of a time zone in which cell 102 is located).

In some implementations, the period of time can be configured to reflect characteristics of specific usage patterns at various hours of a day. An area where mobile devices are most likely located in cell 102 can vary during the day, indicating various usage patterns in specific hours. For example, the period of time can correspond to "commute time," "business hours," "night time," etc. The characteristics of the time of the day can correspond to various usage patterns of mobile devices 108. For example, during commute time, the presence area of cell 102 can be at or near a freeway; during business hours, the presence area of cell 102 can be at or near an office building; at nighttime, the presence area of cell 102 can spread out without a particular point of concentration. The system can calculate the presence area based on locations received, for example, from 4 am to 10 am, and recalculate the presence area based on locations received from 10 am to 4 pm, etc. Locations received in each characteristic time period can be grouped into a set in the system. The locations can be stored in any data structure (e.g., set, list, array, data records in a relational database, etc) on a storage device coupled to the system.

The system can calculate (304) an average geographic location using the locations in the set. Calculating the average geographic location can include calculating an average of latitudes, longitudes, and altitudes of the locations in the set, and designating a position at the calculated average latitude, longitude, and altitude as the average geographic location. In some implementations, calculating the average geographic location can include designating a position at a median latitude, median longitude, and median altitude of the positions in the set as the average geographic location.

The system can calculate (306) distances between the locations in the set and the average geographic location. In some implementations, the system can calculate a linear distance between each of the locations in the set and the average geographic location in Euclidean space. In some implementations, the system can calculate a geodesic distance between each of the locations in the set and the average geographic location, taking curvature of the earth into consideration.

The distances calculated in stage 306 can be designated as a radius associated with a center of a circle (e.g., circle 106*d*). The center can be the average geographic location calculated in stage 304. The radius of the circle can be determined based on at least one distance between a location in the set of locations and the average geographic location. In some implementations, the radius can equal to the longest distance between the average geographic location and a location remaining in the set. In some implementations, the radius can be a distance that, when circle 106*d* is drawn using the radius and the average geographic location as a center, the circle can enclose a percentage (e.g., 80 percent) of the locations remaining in the set. The radius can represent a margin of error beyond which an estimation of a location of a non-GPS-enabled mobile device is less likely to be statistically meaningful.

The system can exclude (308) from the set at least one location based on a distance between the average location and the location. In some implementations, the system can exclude locations whose distance to the average geographic location exceeds a threshold distance. In each pass of the multi-pass analysis, the system can increase a precision of the estimated average geographic location by excluding locations that appear to be away from a concentration of locations (e.g., a cluster). A location that is away from a cluster of locations can be less useful in estimating the presence area of cell 102, and can be excluded. In various implementations, the threshold distance can vary from one pass to a next pass. In some implementations, the threshold distance can be a distance to the average geographic location within which a certain percentage (e.g., 95 percent) of locations in the set are located. In some implementations, the threshold distance can be a set of distances corresponding to the passes (e.g., 1,000 meters for the first pass, 500 meters for the second pass, etc.).

The system can exclude at least one location from the set when the distance between the average geographic location and the location exceeds the threshold distance.

The system can repeat stages 304, 306, and 308 of process 300 until an exit condition is satisfied. The system can determine (310) whether an exit condition is satisfied for terminating the repetition. In some implementations, the exit condition can be satisfied when a number of repetitions reaches a threshold number (e.g., 10 times). The threshold number, as well as the percentage of locations to exclude, can be configurable to fine tune a balance between certainty (e.g., a larger presence area can result in more confidence that a mobile device in the cell is actually located in the presence area) and precision (e.g., a smaller presence area can result in more accurate location of a mobile device). For example, when the percentage is set to 95 percent and the number of passes is set to 10, the final pass can produce a circle that encompasses about 60 percent of all location data points.

In some implementations, the exit condition of stage 310 can be satisfied when the presence area or presence space is sufficiently small. In cells where mobile devices are highly concentrated, a presence area can be sufficiently small that further passes will not necessarily increase the precision. The repetition of stages 304, 306, and 308 can terminate when the radius of the circle reaches below a threshold radius. For example, the threshold radius can be 250 meters. The threshold radius can differ from cell to cell, based on the distribution pattern of the locations in the set received (e.g., number of location data points received, density of the location data points, and concentration areas in the cells).

The system can designate (312) the geographic area as a circle having the average geographic location as a center and a radius based on at least one calculated distance. The geographic area can be associated with a cell (e.g., cell 102). The system can provide the geographic area (e.g., the center and radius) for displaying on a map display of a mobile device. The center can be represented in latitudes and longitudes. In some implementations where distances are calculated in three-dimensional spaces, the center can further be represented in an altitude.

Figure 4:
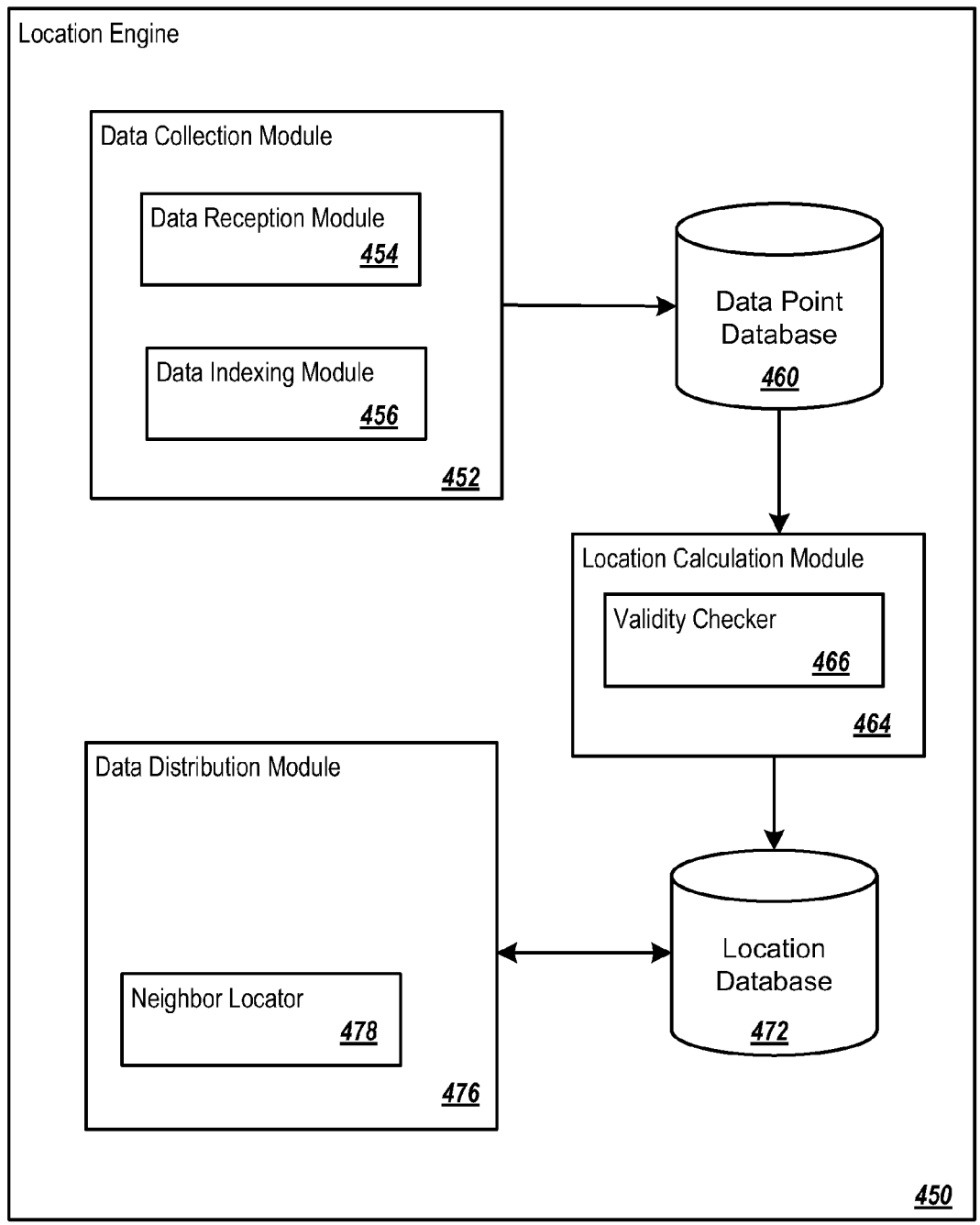
FIG. 4 is a block diagram illustrating an exemplary system implementing techniques of adaptive location determination using mobile devices.

FIG. 4 is a block diagram illustrating an exemplary system implementing techniques of adaptive location determination using mobile devices. The system can include one or more processors, one or more memory devices storing instructions, and other hardware or software components. The system can include location engine 450 that can be used to determine a presence area or presence space to be associated with a cell (e.g., cell 102).

Location engine 450 can include data collection module 452 that can receive data from various mobile devices. The data can include multiple data points that can indicate locations of one or more location-aware mobile devices (e.g., mobile devices 108) as well as cell IDs indicating to which cell towers that mobile devices 108 can connect. In some implementations, the data points can also include information on which time zone mobile devices 108 are located. Data collection module 452 can include data reception module 454, which can receive data transmitted from mobile devices 108 and data indexing module 456. Data indexing module 456 can perform various processing on the received data points. For example, data indexing module 456 can sort latitudes, longitudes, and altitudes based on cell IDs. Data indexing module 456 can also group data into sets based on time periods. For example, a new set of received locations can be created for a configurable period of time (e.g., six hours).

Sets of received locations of mobile devices 108 can be stored in data point database 460. Data point database 460 can store current and historical locations of various mobile devices 108. Data point database 460 can include an ad hoc database, relational database, object-oriented database. Data point database 460 can be hosted locally or remotely in relation to location engine 450.

Location calculation module 464 can be utilized to calculate an average geographic location of sets of data points in data points database, calculate distances between the average geographic location and locations of various data points, and exclude locations from the sets for further computation. Location calculation module 464 can perform the calculations for a particular set (e.g., a set of data points associated with a cell ID) until an exit condition is reached for the particular set. Location calculation module 464 can determine presence areas or presence spaces for each cell ID.

In some implementations, location calculation module 464 can perform validity checks on the presence areas or presence spaces based on various criteria and various data in the data points using validity checker 466. For example, the data points received from mobile devices 108 can include Mobile Country Codes (MCCs) and time zone information. Validity checker 466 can compare a calculated presence area or presence space with polygons corresponding to countries represented by the MCCs and polygons corresponding to the time zones. If a calculated presence area or presence space is located outside the polygons, validity checker 466 can register an anomaly and remove the cell ID.

Presence areas and presence spaces can be defined by a center having the average latitude, longitude, and altitude coordinates of the set of locations. Presence areas and presence spaces can be further defined by a radius determined based on distances from locations in the set of locations to the center. The latitude, longitude, and altitude coordinates of centers for the presence areas and presence spaces and the radii of the presence areas and presence spaces, as well as the cell ID to which the presence areas and presence spaces are associated, can be stored in location database 472. Location database 472 can be updated periodically by location calculation module 464.

The data of location database 472 can be distributed to mobile devices using data distribution module 476. Data distribution module 476 can send information of presence areas and presence spaces (e.g., center coordinates and radii) that is associated with cell IDs to mobile devices (e.g., non-GPS-enabled mobile device 110) upon request, through broadcasting, or using various push technology without receiving requests from the mobile devices.

In some implementations, data distribution module 476 can send multiple presence areas and presence spaces to mobile devices in one transmission session. To reduce the number of location transmission to the mobile devices that can consume communication bandwidths of the mobile device, data distribution module 476 can use neighbor locator 478 to locate cells that are neighbors of the cell in which mobile device 110 is located. Neighboring cells can include, for example, some or all sells that belong to a same location area of a cellular communications network. A location area can include one or more cells and can be associated with a unique number within the cellular communications network, the Location Area Code (LAC). Sending information on presence areas and presence spaces associated with multiple cells (e.g., 20 cells) in the location area or multiple location areas to mobile device 110 can reduce the number of transmissions when mobile device 110 moves across cells. In such implementations, data distribution module 476 only needs to send an update to mobile device 110 when mobile device 110 moves out of all cells previously sent (e.g., to a new location area).

Exemplary User Interfaces of Adaptive Location Determination

Figure 5:
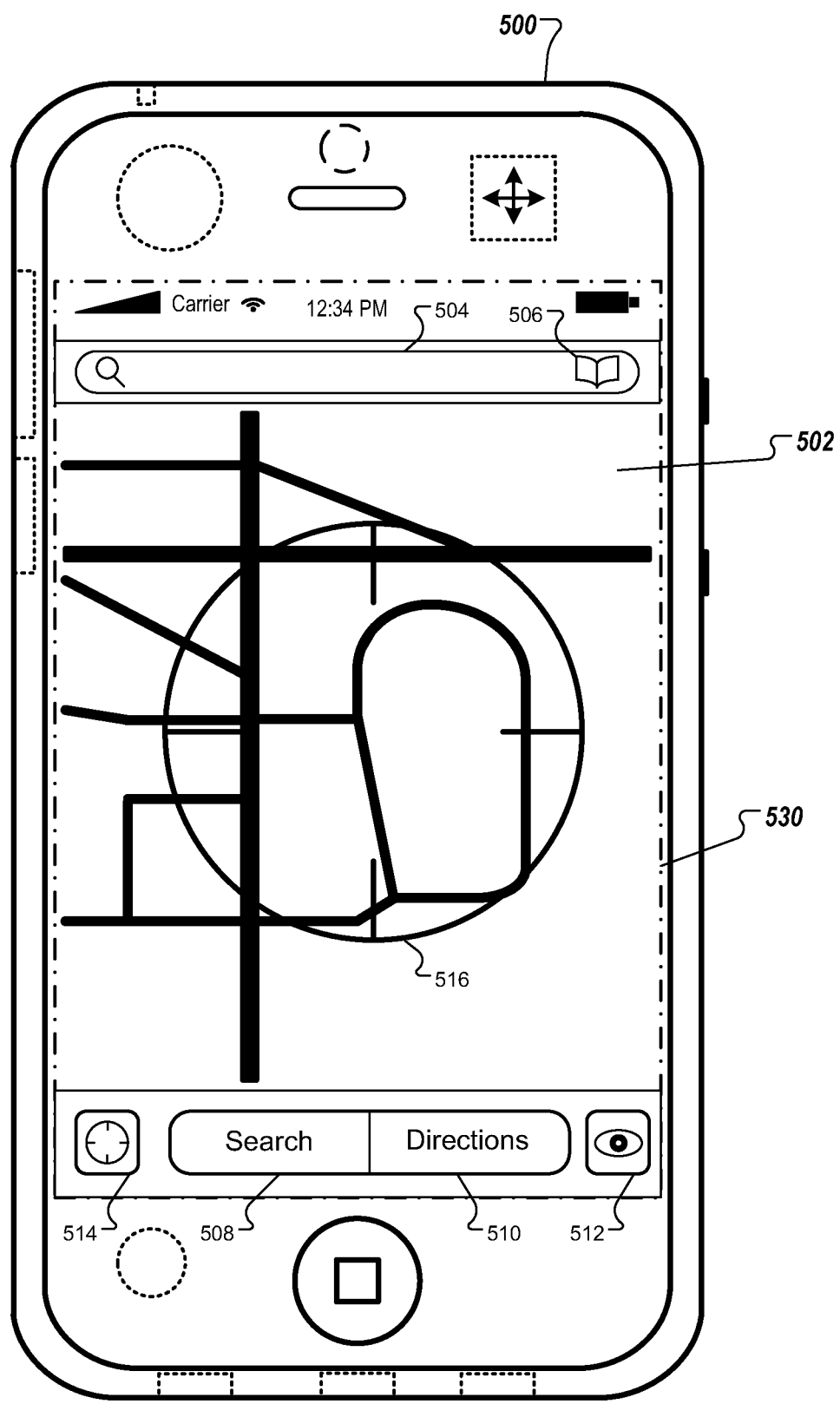
FIG. 5 illustrates an exemplary user interface for adaptive location determination using mobile devices.

FIG. 5 illustrates an exemplary user interface for adaptive location determination using mobile devices. In FIG. 5, an example of map 502 of a geographic area is displayed on mobile device 500. Mobile device 500, when entering a cell (e.g., cell 102), can acquire the cell ID of the cell. Mobile device 500 can request from a server the presence area or presence space associated with the cell ID from the server, or retrieve information on the presence area or presence space from a storage device on mobile device 500 if mobile device 500 has already received the information from a transmission. In some implementations, mobile device 500 can display the map 502 on the touch sensitive display 530 of mobile device 500. The map 502 can be displayed when a user selects a maps object to view mapping and location based services. In some implementations, objects, such as the maps object, can be selected by voice activation. A search bar 504 and a bookmarks list object 506 can be displayed at the top of the map 502. Below the bottom of the map one or more display objects can be displayed, for example a search object 508, a directions object 510, a map view object 512, and a current location object 514.

The search bar 504 can be used to find an address or other location on the map. For example, a user can enter their home address in the search bar 504, and the region containing the address would be displayed on the map 502. The bookmarks list object 506 can, for example, bring up a Bookmarks list that contains addresses that are frequently visited, such as a user's home address. The Bookmarks list can also, for example, contain special bookmarks such as the current location (e.g. the current location of mobile device 500).

Search object 508 can be used to display search bar 504 and other map related search menus. The directions object 510 can, for example, bring up a menu interface that allows the user to enter a start and end location. The interface can then display information (e.g., directions and travel time for a route from the start location to the end location). Map view object 512 can bring up a menu that can allow the user to select display options for map 502. For example, map 502 can be changed from black and white to color, the background of the map can be changed, or the user can change the brightness of the map.

Current location object 514 can allow the user to see a geographic area 516 on the map 502 indicating where the device 500 is currently located. Geographic area 516 can correspond to a presence area (e.g., circle 106*d*) whose center is an average geographic location of data points associated with a current cell where mobile device 500 is located, and whose radius can be determined based on a distance between the average geographic location and one or more locations associated with a current cell. A special current location bookmark can be placed in the Bookmarks list when current location object 514 is selected. If the special current location bookmark was previously set in the Bookmarks list, the old bookmark information can, for example, be replaced with the new current location information. In some implementations, the special current location bookmark is tied to the centroid of geographic area 516. That is, the special current location bookmark can include the coordinates for the centroid of geographic area 516. Geographic area 516 can be based on location data determined or estimated using location engine 450 as previously described in reference to FIG. 4. Geographic area 516 can, for example, be depicted by a circle, rectangle, square, hexagon, or other enclosed region with crosshairs, or some other distinctive element to differentiate geographic area 516 from map 502.

In some implementations, geographic area 516 can indicate a region in which mobile device 500 is determined or estimated to be located, and the geographic area may not necessarily be centered on the actual current position of mobile device 500. In this example, mobile device 500 may be located off-center within the geographic area. In another example, geographic area 516 can be centered on an estimated current position of mobile device 500 (e.g., the average geographic locations of the presence area).

Mobile device 500 can, for example, center the map view on geographic area 516 when the current location object 514 is tapped or otherwise selected. In some implementations, the zoom level of the map can be adjusted based on the accuracy or precision of the location data or the technology, system, or service that provided the location data. For example, the map can be zoomed out when mobile device 500 cannot receive GPS signals for lower accuracy and uses cell tower data to determine its location. The map can be zoomed in for higher accuracy if mobile device 500 is capable of using GPS location data to determine its current location. In some implementations, the zoom level can be based on the velocity of mobile device 500 (e.g., the map can be zoomed out at higher velocities and zoomed in when mobile device 500 is not moving). A combination of accuracy or precision and velocity can also be used.

If all methods for retrieving location-based data fail (e.g., when mobile device 500 is not within communication range of any cell tower, or when validity checker 466 determines that no presence area can be associated with a current cell where mobile device 500 is located), and there are no other systems or services available for determining or estimating the current position of mobile device 500, an error can be displayed to the user and no geographic area is displayed on map 502. The error can, for example, contain a message to the user informing them of the failure and the possible reason or reasons for the failure.

Current location object 514 can be selected, for example, to activate the estimating and displaying of geographic area 516 on map 502, to get directions to or from the estimated current location (i.e., the centroid of geographic area 516), to send the estimated current location of mobile device 500 to a friend (e.g., such that the friend can go to the same location), or to create a bookmark for the estimated current location.

Exemplary System Architecture

Figure 6:
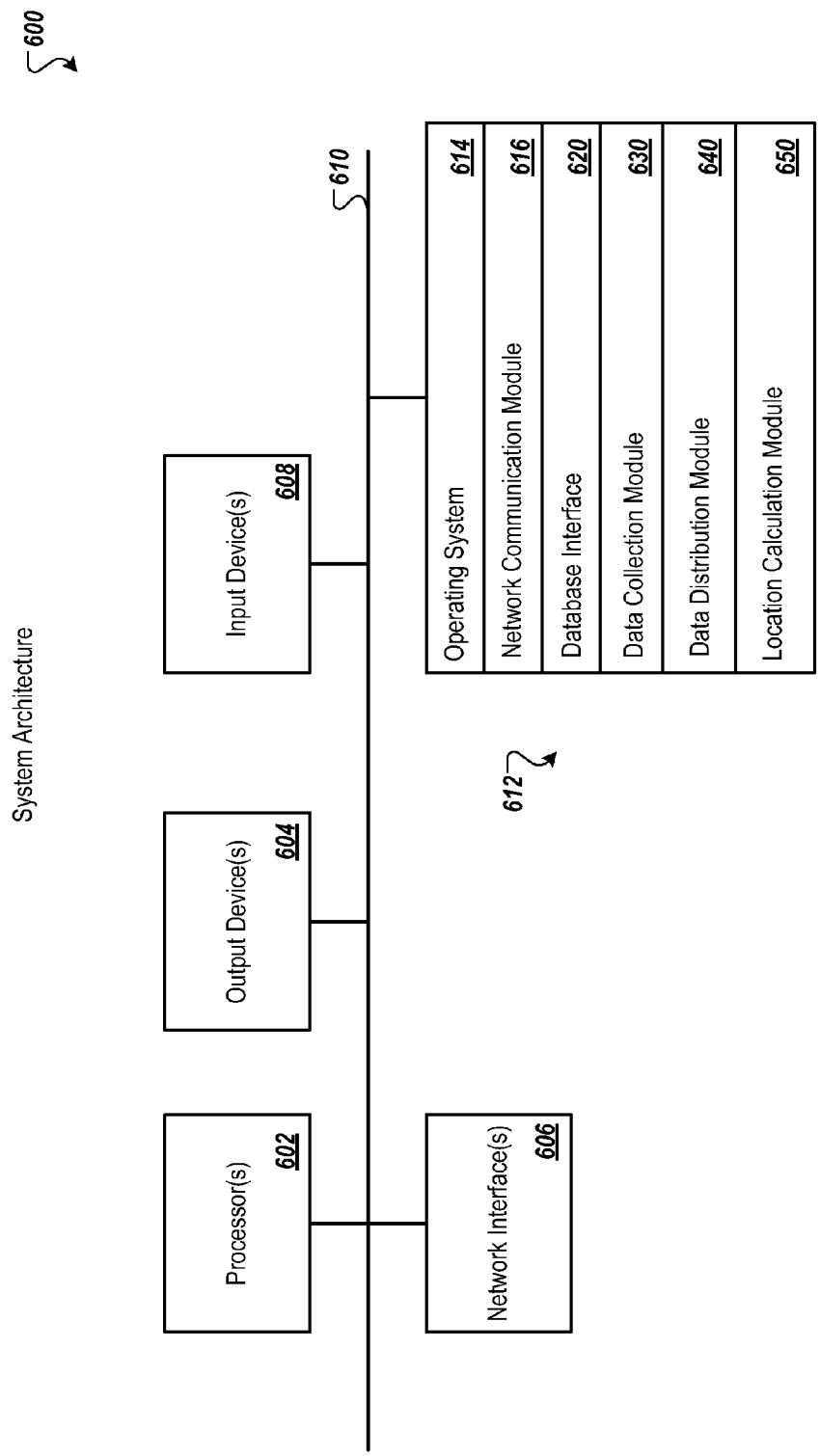
FIG. 6 is a block diagram of an exemplary system architecture for implementing the features and operations described in reference to FIGS. 1-5.

FIG. 6 is a block diagram of an exemplary system architecture 600 for implementing the features and operations described in reference to FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communication module 616, database interface 620, data collection module 630, data distribution module 640, and location calculation module 650, as described in reference to FIGS. 1-5. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.). Database interface 620 can include interfaces to one or more databases (e.g., data point database 460 and location database 472) on a file system. The databases can be organized under a hierarchical folder structure, the folders mapping to directories in the file system. Data collection module 630 can include components for collecting data from multiple mobile devices wirelessly connected to system 600. Data distribution module 640 can perform various functions for transmitting location data in association with cells of a cellular communications network to computing devices, including mobile devices 108 and 110. Location calculation module 650 can include one or more components for performing multi-pass analysis on locations received from mobile devices 108.

Architecture 600 can be included in any device capable of hosting a database application program. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, the location-aware devices are referred to as GPS-enabled. Location-aware mobile devices are not necessarily based on GPS technology. For example, mobile devices that can determine a location using triangulation are location-aware mobile devices and can be used in determining a cell location. Cells are represented as hexagons in the figures. The actual shape of a cell can vary. Locations are described as "circles." The term "circle" used in this specification can include any geometric shape (e.g., an ellipsis, a square, a convex or concave polygon, or a free-style shape) that need not be perfectly circular but is closed or has an appearance of an enclosure. The radius of a geometric shape that is not perfectly circular can include an average distance between various points on the boundary of the geometric shape and a center of the geometric shape. Accordingly, other implementations are within the scope of the following claims.

What is claimed is:

1. A method, comprising:
receiving a set of locations from mobile devices, each location being associated with a cell of a cellular communication network;
in a first iteration:
determining a first centroid of the locations using the set of locations;
determining distances between the first centroid and locations in the set; and
reducing the set of locations, including excluding a first location from the set and preserving a second location in the set based on a first threshold and the distances between the first centroid and the locations;
in a second iteration:
determining a second centroid of locations using locations remaining in the reduced set of locations;
determining distances between the second centroid and locations in the reduced set of locations; and
further reducing the set of locations, including excluding, from the set and based on a second threshold and the distances determined in the second iteration, the second location preserved during the first iteration;
determining a geographic area having a center and a radius, the center corresponding to the second centroid, the radius corresponding to at least one of the distances determined in the second iteration; and
associating the geographic area with the cell when an exit condition is satisfied.

2. The method of claim 1, where the radius is calculated based on a longest distance between the second centroid and a location remaining in the set after the second iteration.

3. The method of claim 1, where the exit condition is satisfied when a number of iterations reaches a threshold number.

4. The method of claim 1, where the exit condition is satisfied when the radius of the geographic area determined in the second iteration reaches below a threshold radius.

5. The method of claim 1, where excluding the second location from the reduced set includes:
determining a threshold distance to the second centroid within which a percentage of the locations remaining in the set that has been reduced in the first iteration are located; and
excluding the second location from the set when the distance between the second centroid and the second location exceeds the threshold distance.

6. The method of claim 1, where each of the locations in the set includes a latitude and a longitude.

7. The method of claim 6, where each of the locations in the set further includes an altitude.

8. The method of claim 1, further comprising:
providing the geographic area for displaying on a map display of a mobile device.

9. The method of claim 1, wherein determining the second centroid of the locations uses a calculation that is different from a calculation used in the first iteration.

10. The method of claim 9, wherein at least one calculation for determining the centroid includes calculating an average geographic location using the set of locations.

11. A system, comprising:
one or more computers configured to perform operations comprising:
receiving a set of locations from mobile devices, each location being associated with a cell of a cellular communication network;
in a first iteration:
determining a first centroid of the locations using the set of locations;
determining distances between the first centroid and locations in the set; and
reducing the set of locations, including excluding a first location from the set and preserving a second location in the set based on a first threshold and the distances between the first centroid and the locations;

in a second iteration:
  determining a second centroid of locations using locations remaining in the reduced set of locations;
  determining distances between the second centroid and locations in the reduced set of locations; and
  further reducing the set of locations, including excluding, from the set and based on a second threshold and the distances determined in the second iteration, the second location preserved during the first iteration;
determining a geographic area having a center and a radius, the center corresponding to the second centroid, the radius corresponding to at least one of the distances, determined in the second iteration; and
associating the geographic area with the cell when an exit condition is satisfied.

12. The system of claim 11, where the radius is calculated based on a longest distance between the second centroid and a location remaining in the set after the second iteration.

13. The system of claim 11, where the exit condition is satisfied when a number of iterations reaches a threshold number.

14. The system of claim 11, where the exit condition is satisfied when the radius of the geographic area determined in the second iteration reaches below a threshold radius.

15. The system of claim 11, where excluding the second location from the reduced set includes:
  determining a threshold distance to the second centroid within which a percentage of the locations remaining in the set that has been reduced in the first iteration are located; and
  excluding the second location from the set when the distance between the second centroid and the second location exceeds the threshold distance.

16. The system of claim 11, where each of the locations in the set includes a latitude and a longitude.

17. The system of claim 16, where each of the locations in the set further includes an altitude.

18. The system of claim 11, the operations further comprising:
  providing the geographic area for displaying on a map display of a mobile device.

19. A computer program product tangibly stored on a non-transitory storage device, operable to cause data processing apparatus to perform operations comprising:
  receiving a set of locations from mobile devices, each location being associated with a cell of a cellular communication network;
  in a first iteration:
    determining a first centroid of the locations using the set of locations;
    determining distances between the first centroid and locations in the set; and
    reducing the set of locations, including excluding a first location from the set and preserving a second location in the set based on a first threshold and the distances between the first centroid and the locations;
  in a second iteration;
    determining a second centroid of locations using locations remaining in the reduced set of locations;
    determining distances between the second centroid and locations in the reduced set of locations; and
    further reducing the set of locations, including excluding, from the set and based on a second threshold and the distances determined in the second iteration, the second location preserved during the first iteration;
  determining a geographic area having a center and a radius, the center corresponding to the second centroid, the radius corresponding to at least one of the distances determined in the second iteration; and
  associating the geographic area with the cell when an exit condition is satisfied.

20. The product of claim 19, where the radius is calculated based on a longest distance between the second centroid and a location remaining in the set after the second iteration.

21. The product of claim 19, where the exit condition is satisfied when a number of iterations reaches a threshold number.

22. The product of claim 19, where the exit condition is satisfied when the radius of the geographic area determined in the second iteration reaches below a threshold radius.

23. The product of claim 19, where excluding the second location from the reduced set includes:
  determining a threshold distance to the second centroid within which a percentage of the locations remaining in the set that has been reduced in the first iteration are located; and
  excluding the second location from the set when the distance between the second centroid and the second location exceeds the threshold distance.

24. The product of claim 19, where each of the locations in the set includes a latitude and a longitude.

25. The product of claim 24, where each of the locations in the set further includes an altitude.

26. The product of claim 19, the operations further comprising:
  providing the geographic area for displaying on a map display of a mobile device.

* * * * *

UNITED STATES PATENT AND TRADEMARK OFFICE
CERTIFICATE OF CORRECTION

PATENT NO. : 8,660,576 B2  
APPLICATION NO. : 12/688811  
DATED : February 25, 2014  
INVENTOR(S) : Ronald K. Huang Page 1 of 1

It is certified that error appears in the above-identified patent and that said Letters Patent is hereby corrected as shown below:

On the Title Page

References Cited, in the listing of Other Publications, Page 3, Column 1, line 8, Delete "Broadbank" and insert -- Broadband --, therefor.

In the Claims

In Column 15, line 14, in Claim 11, after "distances" delete ",".

In Column 16, line 7, in Claim 19, delete "iteration;" and insert -- iteration: --, therefor.

Signed and Sealed this  
Nineteenth Day of August, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,660,576 B2 | Page 1 of 1 |
| APPLICATION NO. | : 12/688811 | |
| DATED | : February 25, 2014 | |
| INVENTOR(S) | : Ronald K. Huang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 159 days.

Signed and Sealed this
Twenty-fifth Day of August, 2015

Michelle K. Lee
*Director of the United States Patent and Trademark Office*